(12) United States Patent
Farnie

(10) Patent No.: US 10,370,830 B2
(45) Date of Patent: *Aug. 6, 2019

(54) EFFECTIVE AREA METAL LOSS CLUSTERING

(71) Applicant: General Electric Company, Schenectady, NY (US)

(72) Inventor: Steven Farnie, Washington (GB)

(73) Assignee: General Electric Company, Schenectady, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/653,361

(22) Filed: Jul. 18, 2017

(65) Prior Publication Data

US 2017/0314238 A1    Nov. 2, 2017

Related U.S. Application Data

(63) Continuation of application No. 14/640,911, filed on Mar. 6, 2015, now Pat. No. 9,708,797.

(51) Int. Cl.
| | | |
|---|---|---|
| *E03B 7/07* | (2006.01) | |
| *G01L 7/00* | (2006.01) | |
| *G01M 5/00* | (2006.01) | |

(52) U.S. Cl.
CPC .............. *E03B 7/07* (2013.01); *G01L 7/00* (2013.01); *G01M 5/0025* (2013.01); *G01M 5/0033* (2013.01)

(58) Field of Classification Search
None
See application file for complete search history.

(56) References Cited

U.S. PATENT DOCUMENTS

| | | | |
|---|---|---|---|
| 2004/0112152 A1* | 6/2004 | Stout .................. | F17D 5/00 73/865.8 |
| 2015/0179044 A1* | 6/2015 | Wu .................... | G08B 21/20 370/311 |

OTHER PUBLICATIONS

Chauhan, V., Swankie, T.D., Espiner, R., and Wood, I; "Developments in Methods for Assessing the Remaining Strength of Corroded Pipelines;" NACE Corrosion Conference and Expo 2009 (pp. 1-29).

(Continued)

*Primary Examiner* — Andre J Allen
(74) *Attorney, Agent, or Firm* — Mintz Levin Cohn Ferris Glovsky and Popeo, P.C.

(57) ABSTRACT

A method of in-line inspection of integrity of a pipeline includes identifying a first prospective cluster related to at least a first feature of the pipeline and a second prospective cluster related to at least a second feature of the pipeline. The method includes calculating an effective area using Length Adaptive Pressure Assessment (LAPA) techniques. The effective area corresponds to a lower calculated burst pressure than surrounding areas of the pipeline. LAPA techniques are used to determine if the first prospective cluster interacts with the second prospective cluster. The method includes combining the first and the second prospective cluster when the effective area includes the first and the second prospective cluster to form a resultant cluster. The method further includes generating an indication of an attribute of the resultant cluster.

20 Claims, 3 Drawing Sheets

(56) References Cited

OTHER PUBLICATIONS

McNealy et al., "Defect Assessment Using Effective Area Method from In-Line Inspection Data", 2008 7th International Pipeline Conference, vol. No. 2, pp. 735-738, Jan. 1, 2008.
International search Report and Written Opinion issued in connection with corresponding PCT Application No. PCT/US2016/019444 dated Jun. 22, 2016.

* cited by examiner

EFFECTIVE AREA METAL LOSS CLUSTERING

CROSS REFERENCE TO RELATED APPLICATION

This application is a continuation of U.S. patent application Ser. No. 14/640,911 entitled "EFFECTIVE AREA METAL LOSS CLUSTERING", filed Mar. 6, 2015, now U.S. Pat. No. 9,708,797, which issued Jul. 18, 2017, the entirety of which is incorporated by reference herein for all purposes.

BACKGROUND

The subject matter disclosed herein relates generally to piping integrity inspection, and, more specifically, to determining interaction of metal loss clusters.

Typically, pipelines exist to transport a wide variety of products, such as crude or refined petroleum, natural gas, water, or any other suitable liquid or gas. In order to ensure that pipelines continue running properly, operators perform various testing and maintenance on the pipelines, such as inspecting pipelines for features. A feature may be metal losses, dents, deformations, or other defects in the pipe. Operators can locate features of the pipeline in a variety of ways.

Direct measurements can be performed (e.g., pipeline excavation), which can be costly, time consuming, or impractical. Alternatively and/or additionally, in-line inspection may be used by operators to inspect pipelines. Tools can be sent through the pipeline to provide information about features of the pipeline. Surface pitting, corrosion, cracks, or other features are often detected by the tool to identify sections that may have lower burst pressures (i.e. the pressure at which the pipe may rupture). A section with a lower burst pressure (i.e. bursts at a lower pressure) may have a more severe feature or damage. However, sometimes in-line inspection does not provide accurate information about the pipeline. Accordingly, a need exists to improve in-line inspection of pipelines.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method of in-line inspection of integrity of a pipeline includes identifying a first prospective cluster related to at least a first feature of the pipeline and a second prospective cluster related to at least a second feature of the pipeline, calculating an effective area using Length Adaptive Pressure Assessment (LAPA) techniques, wherein the effective area corresponds to a lower calculated burst pressure than surrounding areas of the pipeline, wherein LAPA techniques are used to determine if the first prospective cluster interacts with the second prospective cluster, combining the first and the second prospective cluster when the effective area includes the first and the second prospective cluster to form a resultant cluster, and generating an indication of an attribute of the resultant cluster.

In a second embodiment, a tangible, non-transitory computer-readable medium comprising instructions configured to be executed by a processor, the instructions comprising instructions to identify a first prospective cluster related to a first feature of the pipeline and a second prospective cluster related to a second feature of the pipeline, calculate an effective area using a technique, wherein the technique comprises a Length Adaptive Pressure Assessment (LAPA) technique, a Remaining Strength (RStreng) technique, or any combination thereof, wherein the technique is used to determine if the first prospective cluster interacts with the second prospective cluster, combine the first and the second prospective cluster, when the effective area comprises the first and the second prospective cluster, into a resultant cluster, and generate an indication of the resultant cluster.

In a third embodiment, an electronic device configured to assess features of a pipeline includes a processor operatively coupled to a memory, wherein the processor is configured to identify a first prospective cluster related to a first feature of the pipeline and a second prospective cluster related to a second feature of the pipeline, calculate an effective area using an interaction technique, wherein the technique comprises a Length Adaptive Pressure Assessment (LAPA) technique, a Remaining Strength (RStreng) technique, or any combination thereof, wherein the interaction technique is used to determine if the first prospective cluster interacts with the second prospective cluster, combine the first and the second prospective cluster when the effective area includes the first and the second prospective cluster to form a resultant cluster, and generate an indication of the resultant cluster.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
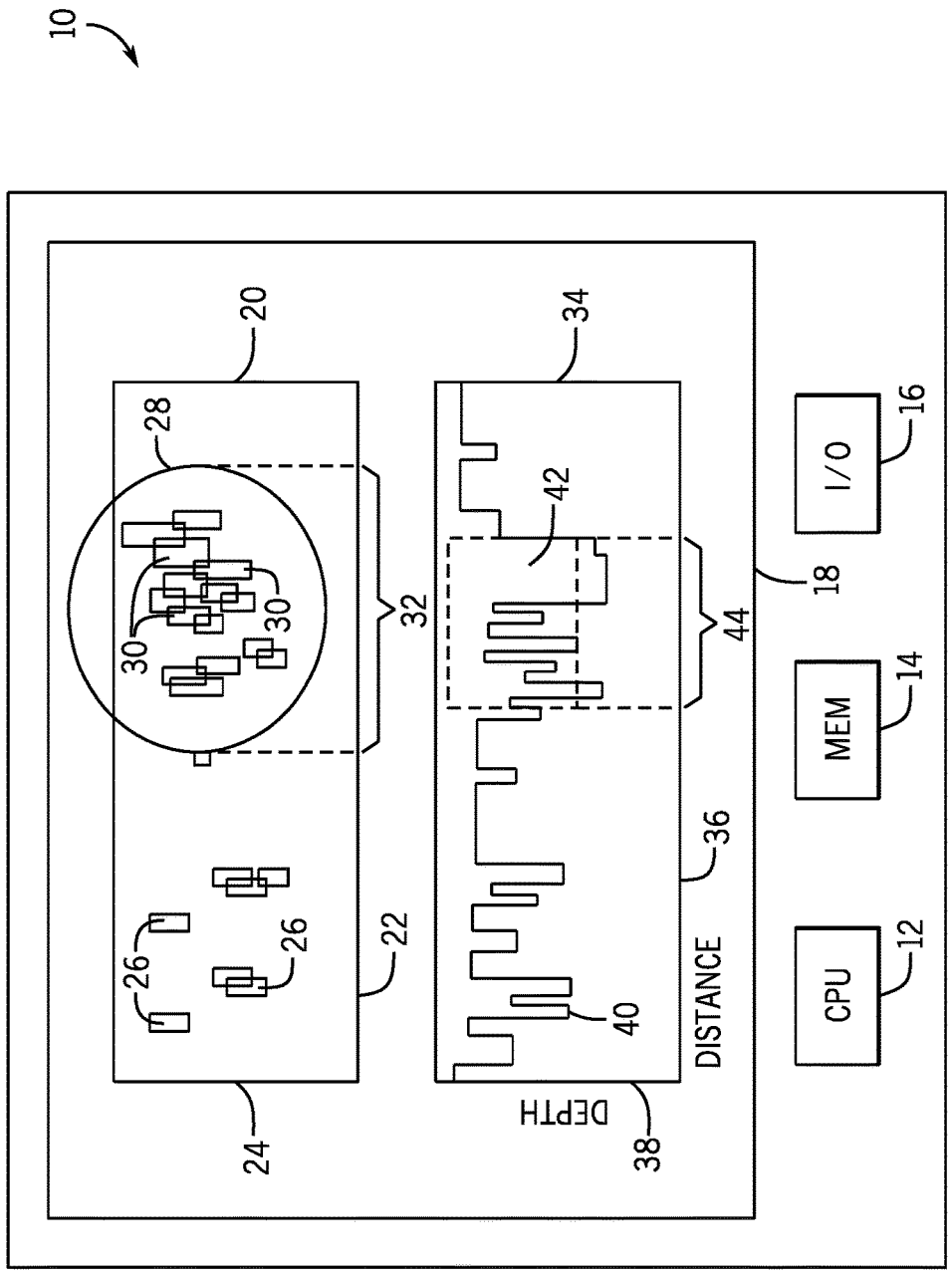
FIG. 1 is a block diagram of an embodiment of a system having a display and a processor configured to process data from a tool run through a pipeline, in accordance with an embodiment of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The techniques described herein relate to predicting accurate burst pressures in a pipeline. Typically, an in-line inspection tool may be run through pipelines to detect features of the pipe. The tool may include bristles that contact the pipeline walls to form a magnetic circuit. In some cases, the tool may detect features (e.g., surface pitting, corrosion, cracks and defects) using magnetic flux leakage from the magnetic circuit. Alternatively, tools may also use acoustics or any other suitable technology for inspecting the pipeline. Other instruments, such as sensors with GPS capability, may be used to record the tool's passage through the pipeline. In some cases, the tool may track passage, time, or location. After the tool passes through the pipeline, the positional data may be combined with the pipeline feature data to provide a location-specific defect profile. While the tool described above may be used, any method suitable for detecting defects and locations may be used to provide a profile of the defects at distances.

After the tool is run, the data collected from the tool may be analyzed to make predictions regarding features of the pipeline. A technique, such as Length Adaptive Pressure Assessment (LAPA) further discussed below, may be used to assess features using the predicted depths from the tool. Once the features are analyzed, in some cases, dig verification is performed on the pipeline. The excavated in-the-ditch measured lengths are compared to the features predicted using the data collected from the tool. Another technique, such as Remaining Strength (RStreng) further discussed below, may be used to determine the burst pressure with excavated measurements of the features. Unfortunately, in many cases the actual measured values do not match properly with the predicted values of the features. One reason may be that the in-line inspection predictions are made to assess accurate feature length. However, the interaction rules between the features of the pipeline can play a significant part in predicting accurate burst pressures and/or locations. Accordingly, a need exists in the field for more accurate burst pressure predictions and/or locations.

The present disclosure is directed to a system and method that addresses the need for more accurate burst pressure predictions and/or locations. By using LAPA techniques to compare clusters, the system and method can account for features that interact due to close proximity. Further, LAPA techniques provide objective interaction results as opposed to various subjective interaction results using distances set by a customer (e.g., 3× wall thickness, 6× wall thickness, feature length, etc.), thereby providing predicted burst pressures that are more consistent with measured burst pressures from excavation. While embodiments of the present disclosure may include the advantageous features and/or advantages described herein, the advantageous features and/or advantages are given as examples, and some embodiments do not require that the advantageous features and/or advantages be incorporated.

Turning to the drawings, FIG. 1 is a diagram of a system 10 for detecting more accurate burst pressure predictions and/or locations. The system may include a processor 12 or multiple processors operatively coupled to a memory 14. The processor 12 may be operatively coupled to the memory 14 to execute instructions for carrying out the presently disclosed techniques. These instructions may be encoded in programs or code stored in a tangible non-transitory computer-readable medium, such as the memory 14 and/or other storage. The processor 12 may be a general purpose processor (e.g., processor of a desktop/laptop computer), system-on-chip (SoC) device, or application-specific integrated circuit, or some other processor configuration. The memory 14, in the embodiment, includes a computer readable medium, such as, without limitation, a hard disk drive, a solid state drive, diskette, flash drive, a compact disc, a digital video disc, random access memory (RAM), and/or any suitable storage device that enables the processor 12 to store, retrieve, and/or execute instructions and/or data. The memory 14 may include one or more local and/or remote storage devices. The system 10 may include a wide variety of inputs/outputs (i.e. I/O 16). The processor 12 of the system 10 may be configured to access data collected from the tool. As explained below, the processor 12 may be configured to predict burst pressures and/or locations with improved accuracy.

The system may include a display 18. The display 18 may be used to display a wide variety of charts, graphs, or any information suitable to analyze the pipeline. As shown in FIG. 1, the top diagram 20 shows a two-dimensional area obtained from a grouping technique. The x-axis 22 shows distances in the pipeline, and the y-axis 24 shows corrosion areas of the pipeline. Various blocks 26 may be used to represent features in the pipeline. A dig site 28 may include features shown as blocks 30. The dig site 28 may be located at a distance 32 in the pipeline. The bottom diagram 34 may show an example of a LAPA profile in accordance with an embodiment of the present disclosure. The diagram 34 may include distance shown on the x-axis 36 and depth of the features shown on the y-axis 38. For instance, a feature, such as a corrosion pit may cause the depth to decrease at a certain distance 40.

RStreng and LAPA may use similar techniques to determine an effective area 42 by utilizing predicted depths from the tool (e.g., with LAPA) or measured depths from the excavation (e.g., with RStreng). The effective area 42 may correspond to a section with a lower burst pressure than surrounding areas (e.g., a lowest burst pressure of the inspected pipeline). The processor 12 may be configured to utilize RStreng and/or LAPA to generate information related to the top diagram 20 and/or bottom diagram 34. More particularly, the processor 12 may utilize RStreng and/or LAPA to represent a one-dimensional axial profile (e.g., diagram 34) by taking a maximum depth at each distance of a two-dimensional profile (e.g., diagram 20). Further, the processor may utilize RStreng and/or LAPA by calculating an average depth of one or more sections of the one-dimensional axial profile. By using the average depth of the sections, the processor 12 may calculate the effective area 42 using RStreng and/or LAPA techniques. The effective area 42 may correspond to a location 44 at a distance to be used to identify a potential dig site 32, such as the area with lower burst pressure than surrounding areas. In addition to assessing existing features, LAPA and/or RStreng may be used to determine if two features should interact.

Figure 2:
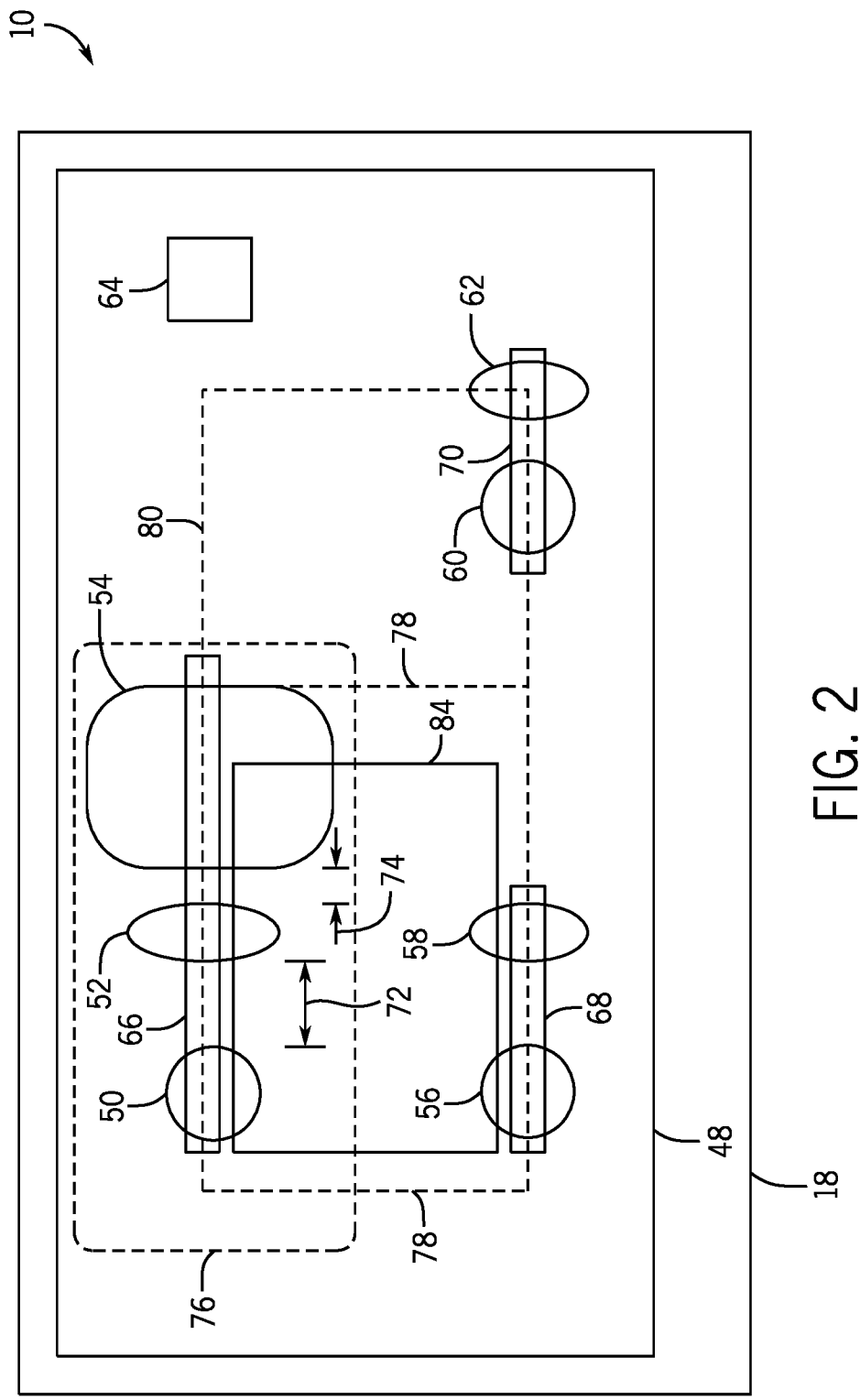
FIG. 2 is another block diagram showing interaction between features of the pipeline using the processor of FIG. 1, in accordance with an embodiment of the present disclosure.

FIG. 2 shows a diagram 48 of a section of a pipeline that may be shown on the display 18 of the system 10. The processor 12 of the system 10 may use LAPA and/or RStreng techniques, such as those described above, for determining if two features should interact. While the interactions are explained and may be used with the display 18, the display 18 is simply used to be illustrative, and the processor 12 may execute instructions (e.g., running code) as described below without displaying the information disclosed herein and provide indications to operators using any suitable method. The data displayed in the diagram 48 may be based on the data from the inspection tool. The inspection tool may detect individual features, such as corrosion pits, of the pipeline, and the individual features may be referred to as boxes. The processor 12 may determine whether various boxes interact. For example, as shown in FIG. 2, various boxes (e.g., boxes 50, 52, 54, 56, 58, 60, 62, and 64) are displayed on the display 18.

The processor 12 may identify and form one or more prospective clusters (e.g., clusters 66, 68, and 70) by applying clustering rules to determine if one or more of the boxes interact. For instances, one or more boxes of a first set of boxes 50, 52, and 54 may have attributes, such as depth, length, width, and location which correspond to attributes, such as depth, length, width, and location of features of the pipeline. The feature depth, length, width, or location may be represented by the length, width, color, or location of the boxes on the display 18. As shown in FIG. 2, the boxes (e.g., the first set of boxes 50, 52, and 54) are of different lengths, widths, and locations to represent the different features of the pipeline. Further, the boxes may be of different color to represent different depths of the features. Traditionally, the processor 12 may not cluster the boxes because the clustering would have been regarded as overly conservative. A conservative cluster may err on the side of indicating greater severity (i.e. deeper and/or longer features with a lower burst pressure). However, in an embodiment of the present disclosure, the processor 12 may begin by clustering the boxes using techniques thought to be conservative, because the conservative clusters are then compared using interaction rules. By using conservative clustering, the clusters may be predicted as more severe (i.e. deeper and/or longer with a lower burst pressure). That is, the processor 12 predicts features conservatively (e.g., more severe clusters) to increase the likelihood of excavation over predicting features such that a pipeline may rupture. Accordingly, the processor 12 may determine whether the boxes interact by determining whether a distance between the boxes is less than a multiple of pipe wall thickness or less than a multiple of the length of the shortest box. For instance, a distance 72 between boxes 50 and 52 may be less than three times the wall thickness or less than three times the length of the shortest box. Similarly, a distance 74 between boxes 52 and 54 may be less than the multiple of wall thickness and/or the multiple of a length of the shortest box. Accordingly, the processor 12 may identify a first prospective cluster 66 related to at least a first feature (e.g., the features represented by boxes 50, 52, and 54) of the pipeline. Additionally and/or alternatively, the grouping/clustering may be determined by utilizing multiple of minimum extent rules for grouping larger (e.g., clusters with 5 or more boxes) together.

The processor 12 may identify a second prospective cluster 68 related to at least a second feature (e.g., the features represented by boxes 56 and 58). The processor 12 may determine whether the second set of boxes 56 and 58 interact with one another (e.g., based on the distance between the boxes 56 and 58) to form a second cluster 68. While the second set of boxes 56 and 58 are in close proximity to one another (e.g., less than a multiple of wall thickness), the boxes 56 and 58 may not be within some multiples of wall thickness to boxes 50, 52, or 54. Accordingly, the processor 12 may determine that the first set of boxes 50, 52, and 54 form a first cluster 66, while the second set of boxes 56 and 58 form a second cluster 68. Similarly, the processor 12 may determine that the distance to a third set of boxes 60 is too great. While the clusters shown in FIG. 2 include two or three boxes, the processor 12 may determine clusters are any suitable number of boxes. Additionally, the processor 12 may identify one or more other prospective clusters. For instance, the processor 12 may determine that boxes 60 and 62 may interact, due to their proximity to one another, to form a third prospective cluster 70. The processor 12 may identify any suitable number of prospective clusters and the clusters may not be shown on the display 48. In some cases, the processor 12 may be configured to apply a tapering background noise level along edges of the clusters to model the difficulty of boxing certain features (e.g., low level features) in recovery areas.

The processor 12 may then calculate an effective area using the LAPA and/or RStreng techniques described above. As shown in FIG. 1, the effective area may be calculated based on the depths at distances and/or the average depth of one or more subsections. As such, the effective area may correspond to the area with lower burst pressure than the surrounding areas (e.g., lowest calculated burst pressure of the pipeline). In some embodiments, a background level of corrosion may be optionally added to account for noise using the tool. The processor 12 may then determine if the effective area includes the area of one or more of the clusters. In some cases, one cluster may be located within the effective area, such as area 76. As such, the processor 12 may utilize the area 76 of the first prospective cluster 66 as the effective area when assessing the burst pressure, and the processor 12 may also utilize the first prospective cluster 66 as a resultant cluster (e.g., a final cluster resulting from the interaction of other clusters). Accordingly, the resultant cluster may be a group of features of the pipeline that are associated with a lower burst pressure than the surrounding areas. In such cases, the processor 12 may determine that the distance between the clusters is sufficiently large enough that the clusters can be treated separate with respect to pipeline integrity.

In other cases, the processor 12 may determine that the first prospective cluster 66 and the second prospective cluster 68 may interact, because the effective area includes the first prospective cluster 66 and the second prospective cluster 68. For instance, the processor 12 may calculate an effective area 78 that includes (e.g., overlaps) the first prospective cluster 66 and the second prospective cluster 68. As such, the processor 12 may combine the first prospective cluster 66 with the second prospective cluster 68 into a resultant cluster 84. The resultant cluster 84, for instance, may be used to assess burst pressure. In such cases, the calculated burst pressure may not be the LAPA burst pressure, and instead the pressure may incorporate the first prospective cluster, the second prospective cluster, and the cluster interaction.

The processor 12 may iteratively, on a feature by feature basis, perform the steps described above to determine if one or more of the prospective clusters interact, such as whether the resultant cluster 84 interacts with the third prospective cluster 70. For instance, once the first prospective cluster 66 and the second prospective cluster 68 are combined by the processor 12 to form the resultant cluster 84, the processor 12 may proceed to calculate another effective area 80 using LAPA and/or RStreng and treating the resultant cluster 84 as a single cluster. The processor 12 may then determine if the resultant cluster 84 and the third prospective cluster 70 should be combined. If the effective area 80 includes the resultant cluster 84 and the third prospective cluster 70, then the processor 12 may combine the resultant cluster 84 with the prospective cluster 70 to form another resultant cluster (e.g., a final cluster). On the other hand, if the effective area does not include the third prospective cluster 70, then the processor 12 may continue by checking the next cluster or proceeding to calculate the burst pressure by utilizing an indication of an attribute of the resultant cluster.

Once the processor 12 combines the appropriate prospective clusters, the processor 12 may proceed to generate an indication of an attribute of the resultant cluster. For instance, the attribute may be the location 44 at the distance described in FIG. 1. Alternatively and/or additionally, an attribute of the resultant cluster may be used in or be the burst pressure calculation of the pipeline. As further example, the attribute of the resultant cluster may also identify the features/boxes (e.g., boxes 50, 52, 54, 56, and 58) associated with the burst pressure of the pipeline. The process described above may be performed by the processor 12 being configured to execute instructions.

Figure 3:
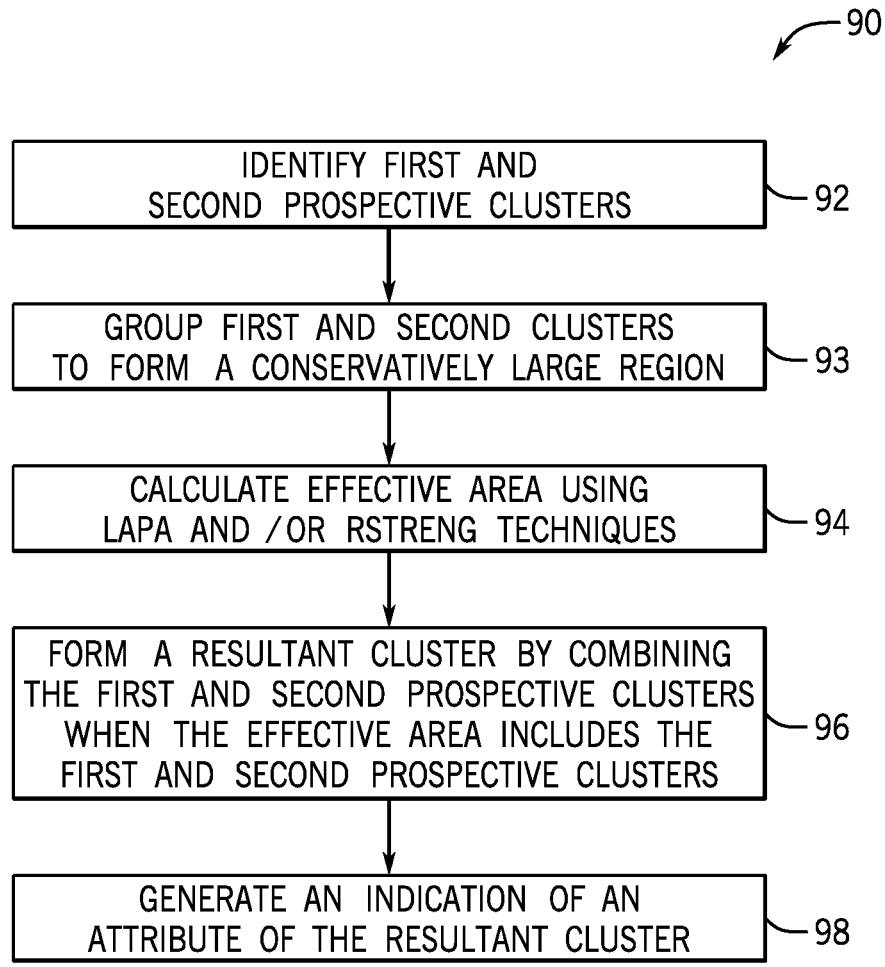
FIG. 3 is a flow chart of a process performed by the processor of FIG. 1, in accordance with an embodiment of the present disclosure.

FIG. 3 is a process 90 performed by the processor 12 in accordance with an embodiment of the present disclosure. As will be appreciated, processor 12 may be configured to execute instructions encoded in programs or code stored in a tangible non-transitory computer-readable medium, such as the memory 14 and/or other storage. The processor 12 may begin the process 90 by accessing (e.g., loading) data from a tool that was run in a pipeline and that indicates one or more features at different locations (e.g., a first feature at a first location and a second feature at a second location) in the pipeline. The processor 12 may continue by identifying the first prospective cluster 66 and the second prospective cluster 68 (block 92). For instance, the processor 12 may begin by identifying one or more boxes. The boxes may be clustered based on the distance between a box and the nearby boxes. The processor 12 may group the first and second clusters to form a conservatively large region (block 93). That is, the processor 12 initially may cluster using grouping techniques that were traditionally found to be conservative. The processor 12 may then calculate an effective area using LAPA and/or RStreng techniques (block 94). The LAPA techniques may be applied to the conservatively large region of block 93. The effective area may correspond to an area of the pipeline that has a lower burst pressure than the surrounding areas. Then the processor 12 may form a resultant cluster by combining the first prospective cluster 66 and second prospective cluster 68 when the effective area includes the first prospective cluster 66 and second prospective cluster 68 (block 96). If the first prospective cluster 66 and second prospective cluster 68 overlap the effective area, the resultant cluster may result in a different burst pressure due to the interactions between the first prospective cluster 66 and second prospective cluster 68, as well as the depth of the space between the two features. The processor 12 may then generate the indication of the attribute of the resultant cluster (block 98). As such, by forming a conservatively large region (block 93), shorter features would be non-conservative. Additionally, by using LAPA techniques, extra length would not increase the severity of the feature. Accordingly, the length of features correspond to more accurate burst pressures, as a minimum length is used to predict burst pressure using LAPA.

By using the LAPA and/or RStreng techniques (e.g., calculating an effective area) as described herein, one of the advantages that may occur is that processor 12 may be used to calculate more accurate burst pressures in pipe segments by accounting for interactions between clusters of features. Bear in mind, the final calculated burst pressure may not use the LAPA burst pressure (e.g., calculated by assessing existing features), but instead use interactions between one or more clusters using LAPA techniques when calculating the final burst pressure. While some advantages may be described herein, some embodiments of the present disclosure may not incorporate some or all of such advantages.

Technical effects of the disclosed embodiments relate to generating an indication of an attribute of a resultant cluster. The resultant cluster may be created by using LAPA and/or RStreng techniques to determine interaction between one ore more prospective clusters. In one embodiment, a system may include a processor that accesses data from a tool that passes through a pipeline. The processor identifies a first and second prospective cluster. The processor then calculates an effective area using LAPA and/or RStreng. The processor then forms a resultant vector by combining the first and the second prospective clusters when the clusters fall within the effective area. The processor then generates an indication of an attribute of the resultant cluster. The indication may be a minimum burst pressure and/or location of the pipeline. The minimum burst pressure and/or location may then be used by operators to perform excavation of the pipeline.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of in-line inspection of integrity of a pipeline, comprising:
    identifying, via a processor, a first prospective cluster related to at least a first feature of the pipeline and a second prospective cluster related to at least a second feature of the pipeline;
    combining, via the processor, the first and the second prospective cluster when a critical area includes the first and the second prospective cluster to form a resultant cluster, wherein the critical area corresponds to an area of the pipeline with a lower burst pressure than surrounding areas of the pipeline; and
    generating, via the processor, an indication of an attribute of the resultant cluster.

2. The method of claim 1, comprising calculating the critical area using a Length Adaptive Pressure Assessment (LAPA) technique.

3. The method of claim 2, wherein the LAPA technique is used to determine if the first prospective cluster interacts with the second prospective cluster.

4. The method of claim 1, comprising calculating the critical area using a Remaining Strength (RStreng) technique.

5. The method of claim 1, wherein the first and second prospective clusters are determined by utilizing a multiple of minimum extent rule.

6. The method of claim 1, comprising applying a background level of corrosion to the critical area.

7. The method of claim 1, wherein the critical area corresponds to the lowest calculated burst pressure of the pipeline.

8. A tangible, non-transitory computer-readable medium comprising instructions configured to be executed by a processor, the instructions comprising instructions to:

identify, via the processor executing the instructions, a first prospective cluster related to a first feature of the pipeline and a second prospective cluster related to a second feature of the pipeline;

combine, via the processor executing the instructions, the first and the second prospective cluster into a resultant cluster when a critical area comprises the first and the second prospective cluster, wherein the critical area corresponds to an area of the pipeline with a lower burst pressure than surrounding areas of the pipeline; and generate, via the processor executing the instructions, an indication of the resultant cluster.

9. The non-transitory computer-readable medium of claim 8, the instructions comprising instructions to taper a background noise level around an edge of the first prospective cluster to model features in recovery areas.

10. The non-transitory computer-readable medium of claim 8, the instructions comprising instructions to determine if the critical area overlaps the first and the second prospective cluster.

11. The non-transitory computer-readable medium of claim 8, the instructions comprising instructions to calculate a burst pressure based on LAPA interaction, RStreng interaction, or any combination thereof, between the first and the second prospective cluster.

12. An electronic device configured to assess features of a pipeline, comprising:

a processor operatively coupled to a memory, wherein the processor is configured to:

identify via the processor a first prospective cluster related to a first feature of the pipeline and a second prospective cluster related to a second feature of the pipeline;

combine via the processor the first and the second prospective cluster when the critical area includes the first and the second prospective cluster to form a resultant cluster, wherein the critical area corresponds to an area of the pipeline with a lower burst pressure than surrounding areas of the pipeline; and generate via the processor an indication of the resultant cluster.

13. The electronic device of claim 12, wherein the first prospective cluster comprises a first box displayed on a display coupled to the electronic device.

14. The electronic device of claim 13, wherein the first box comprises a depth value, length value, and width value of the first feature.

15. The electronic device of claim 14, wherein the first prospective cluster comprises a second box if the distance between the first box and the second box is less than a preset multiple of a wall thickness.

16. The electronic device of claim 12, wherein the processor is configured to calculate the critical area using a Length Adaptive Pressure Assessment (LAPA) technique.

17. The electronic device of claim 16, wherein the LAPA technique is used to determine if the first prospective cluster interacts with the second prospective cluster.

18. The electronic device of claim 12, wherein assessment of the pipeline is performed in-line.

19. The electronic device of claim 12, wherein the processor is configured identify the first prospective cluster by determining if a first box interacts with a second box based on whether a distance between the first box and the second box is less than a multiple of a pipe wall thickness or less than a multiple of a length of the shortest box.

20. The electronic device of claim 19, wherein the first box comprises an attribute, wherein the attribute comprises a depth, length, width, location, or any combination thereof.

* * * * *